United States Patent
Dinges et al.

(10) Patent No.: US 7,668,910 B2
(45) Date of Patent: Feb. 23, 2010

(54) PROVISION OF SERVICES IN A NETWORK COMPRISING COUPLED COMPUTERS

(75) Inventors: Clemens Dinges, Obermichelbach (DE); Dino Drinjakovic, Aachen (DE); Ulrich Epple, Asslar-Berghausen (DE); Christiane Gast, Nürnberg (DE); Michael Schlereth, Wilhermsdorf (DE)

(73) Assignee: Siemens Aktiengesellschaft, Munich (DE)

( * ) Notice: Subject to any disclaimer, the term of this patent is extended or adjusted under 35 U.S.C. 154(b) by 1126 days.

(21) Appl. No.: 11/041,031

(22) Filed: Jan. 21, 2005

(65) Prior Publication Data
US 2005/0198333 A1  Sep. 8, 2005

(30) Foreign Application Priority Data
Jan. 27, 2004  (EP) ................. 04001688

(51) Int. Cl.
*G06F 15/16*  (2006.01)
(52) U.S. Cl. ............. 709/204; 709/205; 709/217; 709/218; 709/219; 709/223; 709/224
(58) Field of Classification Search .......... 709/204, 709/205, 217, 218, 219, 223, 224
See application file for complete search history.

(56) References Cited

U.S. PATENT DOCUMENTS 7,277,946 B2 * 10/2007 Humphrey et al. .......... 709/226

(Continued)

FOREIGN PATENT DOCUMENTS

DE  101 59 931 A1  4/2003

OTHER PUBLICATIONS

Jian Yang, Yiping Zhong and Shiyong Zhang, "An Efficient Interest-Group Based Search Mechanism in Unstructured Peer-to-Peer Networks", Proceedings 2003 International Conference on Computer Networks and Mobile Computing, ICCNMC 2003, Oct. 20, 2003, Shanghai, China, pp. 247-252, XP010666139.

(Continued)

*Primary Examiner*—Liangche A Wang

(57) ABSTRACT

The invention relates to a system and a method for simplified provision of services (1, 2) within a network (3) comprising coupled computers (4, 5), wherein the computers (4, 5) have storage means (20) for storing objects (7, 8), with the objects (7, 8) having first means (21) for loading, storing and processing descriptions (11) of groups (9, 10), with the objects (7, 8) having second means (22) for loading, storing and executing services (1, 2) assigned by the respective groups (9, 10), with a group (9, 10) having associated with it in each case the objects (7, 8) that have stored the description (11) of the respective group (9, 10), with the description (11) of a group (9, 10) determining the semantics of the services (1, 2) assigned to the respective group (9, 10), with the objects (7, 8) having search means (33) for conducting parallel searches within different groups (9, 10) for objects (7, 8) having the services (1, 2) assigned to the respective group (9, 10) and executable by the respective objects (7, 8), and with the objects (7, 8) having third means (23) for initiating the execution of the services (1, 2) which can be executed by another object (7, 8) of the group (9, 10) and are assigned to the respective group (9, 10).

20 Claims, 4 Drawing Sheets

U.S. PATENT DOCUMENTS

| | | | |
|---|---|---|---|
| 7,493,363 B2 * | 2/2009 | Huitema et al. | 709/204 |
| 2003/0009570 A1 | 1/2003 | Moskowitz et al. | |
| 2003/0187974 A1 | 10/2003 | Burbeck et al. | |
| 2004/0148611 A1 * | 7/2004 | Manion et al. | 719/328 |

OTHER PUBLICATIONS

Jiangchuan Liu, Xinyan Zhang, Bo Li, Qian Zhang and Wenwu Zhu, "Distributed Distance Measurement for Large-Scale Networks", Computer Networks, Elsevier Science Publishers B.V., Amsterdam, NL, vol. 41, No. 2, Feb. 5, 2003, pp. 177-192, XP004406475.

Dipanjan Chakraborty, Anupam Joshi, Yelena Yesha and Tim Finin, "GSD: A Novel Group-based Service Discovery Protocol for MANETS", 4th IEEE Conference on Mobile and Wireless Communications Networks, Sep. 9, 2002, pp. 140-144, XP010611835.

* cited by examiner

PROVISION OF SERVICES IN A NETWORK COMPRISING COUPLED COMPUTERS

CROSS REFERENCE TO RELATED APPLICATIONS

This application claims priority to the European application No. 04001688.3, filed Jan. 27, 2004 and which is incorporated by reference herein in its entirety.

FIELD OF INVENTION

The invention relates to a system and a method for providing services within a network comprising coupled computers.

BACKGROUND OF INVENTION

The publication DE 101 59 931 A1 describes a method for accessing services of a distributed automation system having a plurality of automation components by means of one of said automation components. With said method, information relating to an automation component requiring maintenance forms a selection criterion on the basis of which a search is conducted automatically for services relevant to the maintenance of the component requiring maintenance. In this arrangement access takes place within a network of automation components, wherein each automation component is a communication subscriber within the network and wherein what is referred to as a peer-to-peer connection exists at least temporarily between two automation components in each case. In a network that supports peer-to-peer communication, all the communication subscribers are accorded an equal entitlement to access the network. In this scheme each communication subscriber can provide other communication subscribers with information and services and for its part make use of information and services provided by other communication subscribers. In addition the possibility is offered of searching for and locating information and services residing on other communication subscribers and subsequently accessing these functions or services.

SUMMARY OF INVENTION

The object of the invention is to simplify the provision of services in a network comprising coupled computers.

This object is achieved by a system for providing services in a network comprising coupled computers,
wherein the computers have storage means for storing objects,
wherein the objects have first means for loading, storing and processing descriptions of groups,
wherein the objects have second means for loading, storing and executing services assigned to the respective groups,
wherein in each case a group has associated with it the objects which have stored the description of the respective group,
wherein the description of a group determines the semantics of the services assigned to the respective group,
wherein the objects have search means enabling parallel searching within different groups for objects having services assigned to the respective group and executable by the respective objects, and
wherein the objects have third means for initiating the execution of the services which are executable by another object of the group and are assigned to the respective group.

This object is also achieved by a method for providing services in a network comprising coupled computers,
wherein the computers store objects,
wherein the objects load, store and process descriptions of groups,
wherein the objects load, store and execute services assigned to the respective groups,
wherein in each case a group has associated with it the objects which have stored the description of the respective group,
wherein the description of a group determines the semantics of the services assigned to the respective group,
wherein the objects conduct parallel searches within different groups for objects having the services assigned to the respective group and executable by the respective objects, and
wherein the objects initiate the execution of the services which are executable by another object of the group and are assigned to the respective group.

The invention is the basis of an—in particular multilayer—architecture for a decentralized, self-organizing information system. The modular system structure permits a dynamic extensibility of the functionality of the system and therefore a high level of flexibility in operation. The objects are also referred to as peers (peer=of equal rank). The groups are also referred to as semantic groups. The description of groups, i.e. the definition of a semantic classification structure, also referred to as a group entity, can be dynamically loaded into peers, in particular also during stationary operation. This enables new search strategies but also new functionality to be incorporated into the system dynamically.

The proposed virtual search network is not dependent on central units, i.e. no node has to guarantee its availability in the dynamic system. Changes in the network topology can be adapted without great effort by the individual nodes, without alteration of the overall overlay structure. The search for services in the overlay network avoids what are referred to as flooding mechanisms.

According to an advantageous embodiment of the system, the objects have fourth means for locating, reading, retrieving, downloading and/or defining the descriptions of groups. This avoids the requirement for the operator to explicitly inform a peer which group entity and consequently also which membership it is to load. This therefore increases the degree of autonomy of a peer by leaving to the peer itself the decision as to which group entity it would like to possess. The peer possesses the ability to collect information about new semantic groups independently and to inquire about the location of the associated group entities. Identically to the search for application-specific information or services, searches for semantic groups can be conducted in a special, separate search network with its own networking rules. The peer which receives a request for a specific group and is a member of the group being searched for would send the corresponding information, in this case the group entity, to the requesting peer, which then loads this data independently and becomes a member of the desired semantic group. A suitable distance function and also a suitable networking strategy can be specified for this special search network.

According to a further advantageous embodiment of the system, the objects have fifth means for locating and/or defining the services assigned to the groups. This enables in particular new services to be defined.

According to a further advantageous embodiment of the system, the objects have sixth means for determining affiliations of the respective objects to the groups so that the information relating to loaded group entities is available within the peer.

According to a further advantageous embodiment of the system, the objects have seventh means for loading and executing a distance function, whereby the distance function is provided for determining the semantic distance between two objects in each case. A semantic proximity calculation is not provided in previously known peer-to-peer systems. A hash function is typically used in known systems in order to transform a given service description into a system-wide unique numerical value (e.g. Freenet, Chord, Tapestry, CAN). This value is then assigned to the address of the node in the network that provides this service. The main problem of the hashing approach lies in its mathematical characteristics: As the generation of hash values corresponds to the generation of evenly distributed random values, the semantic proximity of service descriptions is not represented in the hash values, i.e. the neighborhoods formed have no semantic meaning within a virtual search network.

Eighth means for generating a list of the objects with the least semantic distance to the respective object allow precisely this: formation of neighborhoods based on the interpretation of the content of the services and information provided in the network. This also allows approximate searches and domain searches which cannot be realized using hash-based approaches. It is proposed in particular that the objects have ninth means for influencing the search means for searching for objects as a function of the respective distance. If the system possesses multiple semantic overlay networks, relevant nodes can be filtered out already based on the specific search ahead of an analysis of the content of the request and in this way system performance can be substantially increased, in particular if results of different searches can be combined.

According to a further advantageous embodiment of the system, the objects have tenth means for processing descriptions of the services.

To speed up the search, according to a further advantageous embodiment of the system the objects have eleventh means for forwarding search requests for services which cannot be executed by the respective object to further objects within the respective group. It also proves advantageous if twelfth means for recognizing new objects are provided within a group.

It is advantageous in particular with hierarchically structurable information systems if the objects in a group are hierarchically related to one another. Services for providing information are advantageously provided in the system.

A system proves particularly flexible if an object within a group only partially knows further objects of the respective group, with all further objects of the respective group being communicatively accessible at least indirectly. This is the case when each of the groups is a related group.

A simple way of transmitting search requests in the system is produced if, according to a further advantageous embodiment of the system, the objects have communication means for transmitting messages, with the communication means having analytical means for analyzing the semantic content of the messages. A message is generally understood to mean a self-contained set of information which is exchanged between communication partners on the basis of known or implicit agreements. Semantics is generally the theory of the meaning of the content of a language. In the proposed system, information (e.g. documents) is provided with semantics, i.e. with machine-understandable meaning. The information which results from the interpretation of the content of a message is referred to as the semantics of a message. The objective is the development from machine-readable to machine-understandable data. The proposed system has the intelligence and capability to forward messages based on the analysis of their semantic content.

If the network comprising coupled computers is an industrial automation system, then in particular a process information system can be provided which enables access to information and services of objects in a distributed automation system with self-configuring, multidimensional and dynamically loadable semantic classification structures.

BRIEF DESCRIPTION OF THE DRAWINGS

The invention will be described and explained in more detail below with reference to the exemplary embodiments shown in the figures, in which.

DETAILED DESCRIPTION OF INVENTION

Figure 1:
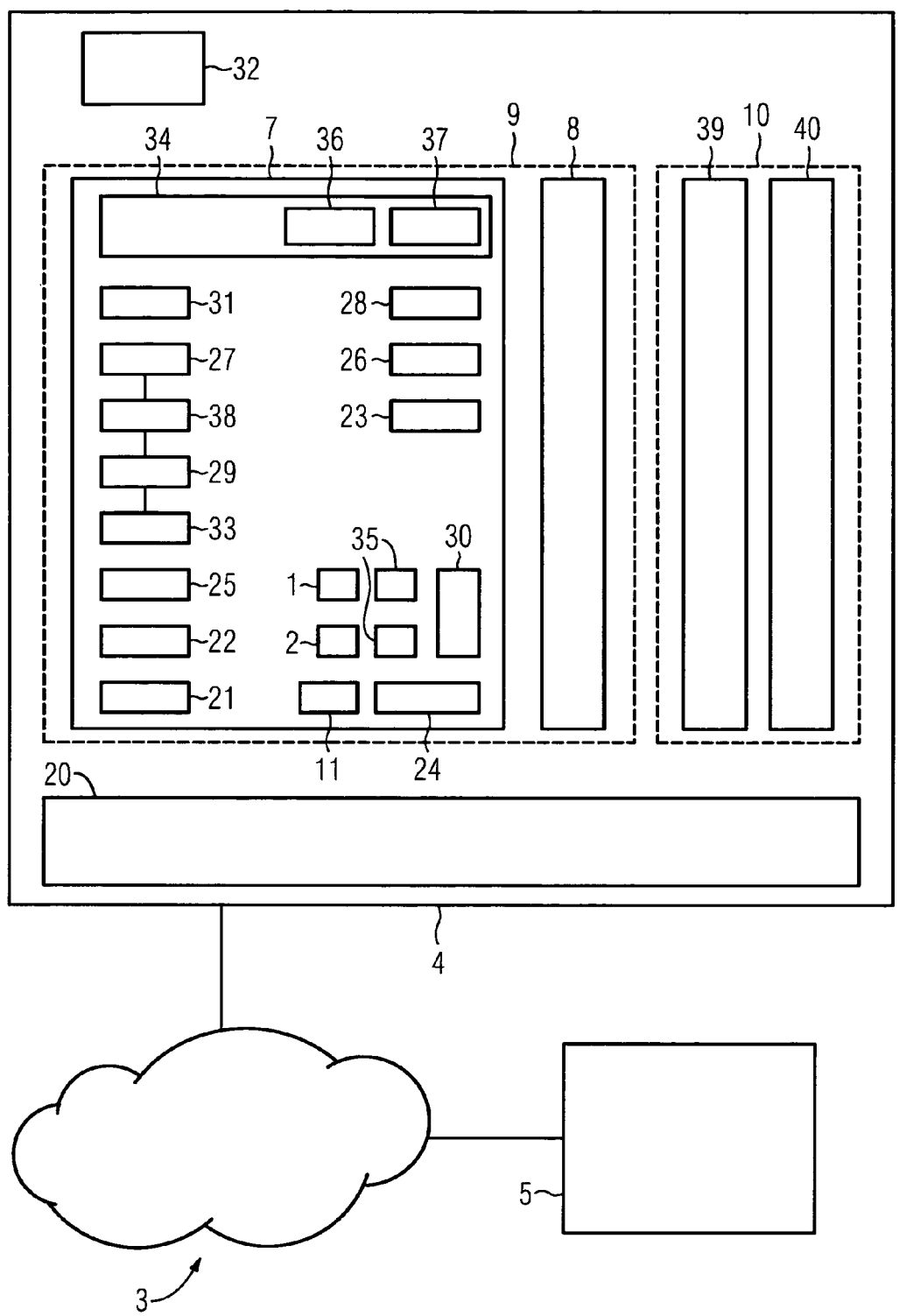
FIG. 1 shows a system for providing services in a network comprising coupled computers.

FIG. 1 shows an exemplary embodiment of a system for providing services 1, 2 in a network 3 comprising coupled computers 4, 5. The computer 4 has storage means 20 for storing objects 7, 8, 39, 40. FIG. 1 shows two groups 9, 10 with which the objects 7, 39 and 8, 40, respectively, are associated. The depicted object 7 has stored the description 11 of the group 9. The object 7 has first means 21 for loading, storing and processing the description 11 of the group 9. In addition the object 7 has second means 22 for loading, storing and executing services 1, 2 assigned by the group 9. The description 11 of the group 9 determines the semantics of the services 1, 2 assigned to the group 9. The object 7 has search means 33 for parallel searching within the different groups 9, 10 for the objects 7, 8, 39, 40 with the services 1, 2 assigned to the respective group 9, 10 and executable by the respective objects 7, 8, 39, 40. In addition the object 7 has third means 23 for initiating the execution of the services assigned to group 9 and executable by another object 8 of group 9. The depicted object 7 has fourth means 24 for locating, reading, retrieving, downloading and/or defining the descriptions 11 of groups 9, 10. In addition the object 7 has fifth means 25 for locating and/or defining the services 1, 2 assigned to the groups 9, 10. Affiliations of the object 7 to the groups 9, 10 can be determined using sixth means 26 of the object 7. The object 7 has seventh means 27 for loading and executing a distance function 38 which is provided for determining the semantic distance between two objects 7, 8 in each case. A list of objects 8 with the least semantic distance to the respective object 7 can be generated using eighth means 28 of the object 7. The object 7 has ninth means 29 for influencing the search means 33 as a function of the respective semantic distance. Descriptions 35 of the services 1, 2 are processed using tenth means 30 of the object 7. The object 7 additionally has eleventh means 31 for forwarding search requests for services which cannot be executed by the object 7 to further objects 8 within the respective group 9. New objects 7, 8 within a group 9, 10 can be recognized using twelfth means 32. The object 7 has communication means 34 for transmitting messages 36, with the communications means 34 having analytical means 37 for analyzing the semantic content of the messages 36.

Figure 2:
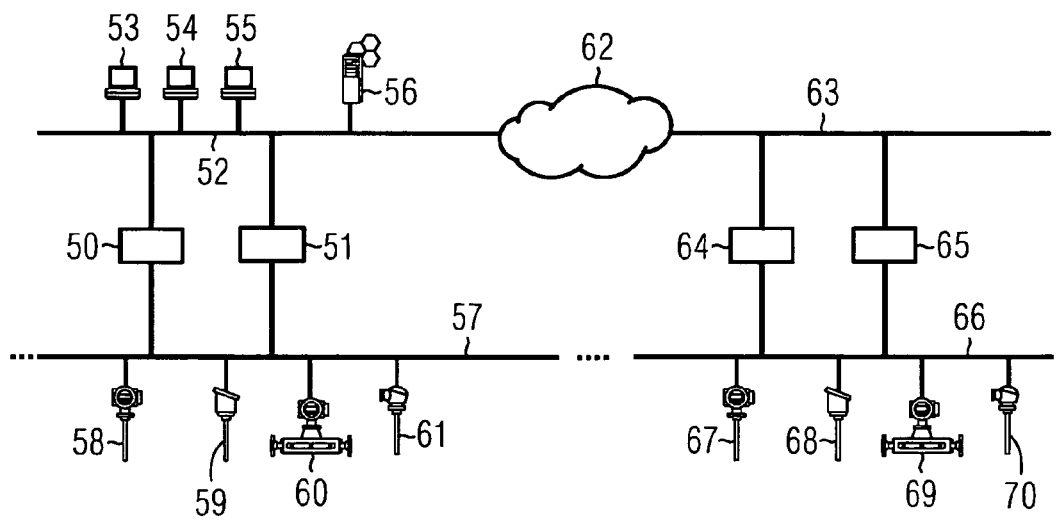
FIG. 2 shows the system configuration for an application scenario.

FIG. 2 shows the system configuration for an application scenario. Computers 53-55 having engineering or, as the case may be, application programs, management information systems 56 as well as a process control system 50 and a programmable logic controller 51 are interlinked via a corporate network 52. The process control system 50 and the programmable logic controller 51 are connected to field devices 58-61 via a field bus 57. The corporate network 52 is connected to a further corporate network 63 via an internet 62. The further corporate network 63 is connected to a further field bus 66 via a programmable logic controller 64 (PLC) and an engineering station 65. Messages from and to field devices 67-70 are transmitted via the field bus 66.

The use of the invention in process control engineering will be described below. Process control engineering is concerned with functions, actions and means for managing processes and tools in the process industry. Compared to automation engineering, its focus is less on the signal-processing measurement, control and regulation (MSR) functions which lead to automatic interventions into processes, but more on the holistic consideration of all operative tasks which concern the corporate resource "product information". In this context reference is also made to information-oriented process control engineering. The predominantly signal-oriented automation engineering can be interpreted here as a subset of information-oriented process control engineering.

Process control systems (PCS), programmable logic controllers (PLC), microcontroller-based "intelligent" field devices and industrial PCs are mainly used as process control oriented digital computers. These computers are networked via communication systems, for example field bus systems and Ethernet-based TCP/IP networks, to form a distributed information processing system. A system of this kind has interfaces to the controlling process, to the operating personnel and—as a result of the advance of networking and globalization—increasingly to office software and transaction-oriented operational information systems on the intranet or internet, such as e.g. enterprise resource planning (ERP) systems or manufacturing information systems (MIS).

The information interface to the process essentially consists of measurement and setting signals with direct physical meaning for the method-related process and is implemented by means of sensors and actuators. The feedback of suitable setting signals into the process consisting of measurement signals is the task of what is referred to as the basic automation. This operation is already largely mastered both theoretically and practically today.

However, the consideration of the process signals for a functioning interaction with operational information systems and the operating personnel is no longer sufficient these days. Additional information is required in production tracking, quality assurance, device management and maintenance, and said information is assigned to the individual entities of a production process (products, tools, devices). In today's commonest control system structures the locations of this information are distributed over the entire system. The process control related software system must therefore handle not only automation but in particular also information management tasks (as an "information broker").

Associated with this is the necessity to master distributed and in particular decentralized systems. The more complex the technical systems that are to be controlled become, the more obviously centralistic concepts, such as are still encountered today in certain process control system families, are coming up against their limits. Moreover, in real-world situations many problems result from the distribution of the software to decentralized computer nodes running under different operating systems and with different architectures and hardware scaling. A further problem is that in its totality the process control related software consists of heterogeneous applications from different vendors and in different versions, some of which have been modeled and implemented using completely different means. Often these problems are due to the long service life of process control technical hardware and software and therefore are difficult to avoid.

In today's automation systems a client wanting to use the services or, as the case may be, information of other objects of the system has to be notified explicitly in advance in a configuration phase in which system components the objects in question are located. It must be specified, for example, to which component alarm data is to be sent, or communicated to a visualization system in which components it can read which measured values. In integrated control systems, in order to simplify this complex configuration operation, the manufacturers provide engineering system functions which support an automatic compilation and loading of the corresponding configuration files.

However, an ex-ante configuration is not always sufficient, in particular in future system structures:

In many cases the requirements for using an object instance do not reveal themselves until later, for example as a result of a spontaneously occurring problem or a new automation or process control related issue.

The interconnection of the computers and microcomputer systems with powerful bus systems down to field level also opens up the possibility of free assignment and dynamic movability between different execution components for process-related object instances. This can be used, for example, for a dynamic reconfiguration of the system during operation, for example to increase availability in the event of component failure in a specific situation or to improve bus and processor load balancing in the network through targeted optimization measures.

Support for the configuration by the engineering system is only possible to a limited extent in heterogeneous information systems. The configuration overhead therefore increases substantially in particular in the field of operation control systems and in the connection of legacy and other-vendor systems.

The above-mentioned requirements are implemented in known systems by configuration changes in an engineering phase outside of ongoing operation, i.e. the configuration is usually static during operation. In systems which can be reconfigured during operation a configuration change, e.g. for a communication address of a device, must be loaded into all other devices of the system. As a result an automation system update takes a very long time.

The description that follows relates to an architectural design and the implementation of a distributed system organized on a decentralized basis and containing network nodes ("peers") between which the communication connection is not specified a priori, i.e. not by means of engineering, but in principle is established only as needed during ongoing operation by means of a search operation. In this scheme peers have the characteristic that they can be both source and sink of a communication connection. The communication connection is used to request services (e.g. an archiving service). A special service is the provision of information (e.g. of a specific measured value). A system of this kind is also referred to as a peer-to-peer system (Peer-to-Peer=P2P).

P2P systems of this kind are known from the internet (e.g. Napster, Gnutella). The search strategy that is applied with such known systems is, however, identical for all the peers involved and is based on a pure text search or, as the case may be, on attribute-oriented search criteria.

Several key technologies already available in principle will be described below, said key technologies being present in different embodiments in many languages and software architectures:
  Object-oriented modeling
  Component technologies
  Internet technologies (XML, SOAP, WSDL, Web Services)

In the context of the exemplary embodiments of the invention described, these key technologies will be combined and tailored to the requirements of process control engineering. Requirements for scalability, efficiency, online capability and platform independence will also be taken into account at the same time.

In known, "classical" P2P systems, "peer-to-peer" refers to the capability of computers to provide other computers with services, to search for and locate services provided by other computers and then to access these services, and thereby combine both server and client characteristics and functionalities. In this context the term "computer" denotes any kind of computer system. In this context "classical" means the existence of a predefined, rigid classification structure as well as the use of non-semantic search strategies. Most P2P systems usually provide only a single service, typically the search for documents. A client is a software application which avails itself of a service (e.g. information) provided by another software application). A server is a software application which provides a service (e.g. information) for another software application on a job-oriented basis.

The extension of the P2P idea consists in particular in the adaptation of the search strategy to the content of the search request or, as the case may be, to the group affiliation of the search partners as well as in the possibility of being able to load different search algorithms dynamically and in parallel onto a common P2P base network.

In the following there will be an analysis and discussion of the currently existing P2P architectures with regard to requirements facing a P2P system as an architecture having means for implementing process control applications. In addition to modeling possibilities, runtime aspects, e.g. using meta information and providing services through an application interface, will also be considered.

Based on these requirements, the architecture model of a P2P system with self-configuring, multidimensional and dynamically loadable, semantic classification structures will then be described. This P2P system provides the infrastructure for the respective specific applications.

The search strategies in known P2P systems prove to be extremely inefficient and permit either no or only an inadequate scalability of the system. This inefficiency is based on the fact that some P2P systems form an overlay network with random neighborhoods in which requests are forwarded blind from node to node. As an alternative to this there exist proposals for P2P systems which specify a relatively rigid overlay structure in which information is stored at nodes based on what are known as hash functions. The hash value allocated to an item of information then enables this information to be found again more easily in the system.

In principle there exist three fundamental approaches for an architecture and the associated search strategy in a distributed environment; these will be described in detail below: a central service administration (central service repository), flooding of the network with requests (flooding/broadcasting), and the use of distributed hash tables (distributed hash table systems).

In a centralistic architecture, one central server or a small number of selected central servers administer the descriptions of all the services that are provided in the network. For this reason service providers send a description of their services to one of these servers, whereas seekers of services contact these servers when they want to have a description and also to learn the location of a particular service. In order to keep the central service directories up to date at all times, obsolete services, i.e. services which are no longer available in the network, must be deleted manually or periodically removed from the directory within a predefined time period.

This architecture is not suitable for dynamic networks, because no server can guarantee its accessibility in the wake of frequent changes to the network topology. Moreover, central servers represent a "single point of failure". A failure even of just a few nodes would put the entire system out of service. This vulnerable point of the system is often the target for attacks on the system from outside.

However, this architecture is widely established in other network areas. For example, CORBA's Trading Object Service, Sun's Jini and Bluetooth use centralistic structures of this type. This also applies to protocols such as Napster and its clones or the Service Location Protocol (SLP). Web Services, which are becoming increasingly important in e-business applications, are also usually managed by means of UDDI (Universal Description, Discovery and Integration of Web Services) in central directories. Finally, approaches for a search for services on agent platforms such as, for example, LEAP (Lightweight Extensible Agent Platform) and FIPA-OS (Foundation for Intelligent Physical Agents) are also based mainly on centralistic service management structures.

Broadcasting architectures stand in direct contrast to central directories. Instead of distributing their service descriptions to other nodes in the network, service providers leave them locally at the location of the services themselves. As a result, search requests for a specific service have to be forwarded to all members of the network, where they are compared with the existing service descriptions. Refined flooding algorithms have been developed in order to reduce the repeated arrival of one and the same request at a node. This problem cannot be avoided completely, however.

In general broadcasting mechanisms of this kind are not suitable for networks due to their high bandwidth requirements. What's more, unnecessary requests reduce the performance of the individual nodes during the processing of relevant requests. Broadcasting could nevertheless be the only possible means in network areas with extremely high topology dynamics. Typical representatives of the broadcasting strategy are SSDP (Simple Service Discovery Protocol) and also totally decentralized file sharing protocols such as Gnutella or JXTA Search.

A further approach in addition to central server-based and broadcast-oriented approaches is hashing. The best-known representatives of the hashing approach are Freenet, Chord, Tapestry and CAN. Generally a hash function is used in order to transform a given service description into a numerical value that is unique system-wide. Said value is then assigned to the address of that node in the network that provides the said service. The main problem with the hashing approach lies in its mathematical characteristics: Because the generation of hash values corresponds to the generation of equally distributed random values, the semantic proximity of service descriptions is not represented in the hash values. That is why hashing can only be used for service descriptions with very little semantics (e.g. service description as a Boolean linking of keywords). Semantically rich descriptions, e.g. ontology-based approaches which enable a semantic "proximity calculation", cannot be effectively processed using hash functions. In DHT systems the resources to be administered, i.e. information and services, have no relationship with one another.

Although hashing demonstrates good performance in targeted searches in which the search key is clearly known, it is not effective for approximate searches and area searches.

The idea of storing information at or, as the case may be, moving information in the course of time to the location where relevant requests originate has already been realized in distributed database systems. The algorithms that have been used for distributed databases are, however, based on two fundamental assumptions which do not apply to P2P systems: that a small number of stable nodes exist and that the user of the system has total control over the location of the information. However, in a globally distributed P2P system it is probable that certain nodes may not be ready to accept any information for administration or to enter into any neighborhoods.

DHT systems, like all existing P2P systems, are based on only a single overlay network. If one considers an overlay network to be a finite set of nodes N, with each node $n_i \in N$ having a specific, finite set of information I (at the same time a specific item of information can reside in more than one node), then each node is virtually connected to a small number of nodes (referred to as its neighbors). The latter are in turn virtually connected to further nodes. If the connection is represented as a triple $(n_i, n_j, l)$, then $n_i$ and $n_j$ are the connected nodes and l designates the type of connection. The set of connections with the same l forms the overlay network. In present-day P2P systems all the connections have the same l. This is a purely arbitrary restriction. In principle a P2P system can have a number of overlay networks. In this case a node can be "neighbors" with a specific set of nodes via an $l_1$ connection and via an $l_2$ connection with a possibly different group of nodes. This would substantially improve the performance of a search in a system with an extremely large number of nodes. Although SUN's JXTA Framework supports the capability of group formation in a P2P system, it specifies neither the structure of the groups nor when nodes are to join a group or how a search between groups is to be executed.

An analysis of the different approaches shows that none of the approaches can enable a semantics-based search for services. The existing approaches are either not suitable for applications in completely dynamic networks (in the case of the server-based architectures), require the existence of large bandwidths (in the case of the broadcasting approach) which are not always available due to the great heterogeneity of the network node resources, or (in the case of hash-based architectures) support only a semantically weak service description. The present invention offers a new approach for the semantic search for services.

The requirement for a general P2P system with a large range of applications implies that the specific semantics of an application cannot be expressed to the full extent. One remedy consists in replacing the initial condition of a constant model scope with a scalable model scope. An open model architecture is proposed with an abstract, general basic system model which can be extended with more specialized application concepts in order to close the semantic gap. The separation of basic model and application models leads to the separation of the application-specific semantics from the underlying general modeling patterns (schemas) and is the basis for the implementation of the application-independent basic functions and services—and hence for the interoperability of different applications. Furthermore this approach has the advantage that a software developer possessing the basic model no longer needs to formulate the solution to fundamental basic problems himself and instead can concentrate on solving the problems of the application domain. The specification of the semantics takes place, for example, in what are known as XML schemas, separately from the actual documents in which a semantic identification is carried out using the defined tags.

In the architectural design a compromise must also be made between the flexibility of the runtime representation of a software application and its performance. A flexible representation implies a complex system with a high degree of variability, in particular also of the structure (structure variance). A system of this kind possesses a high level of connectivity (many explicit internal relationships and relationship types) and a high degree of variety (many system components and component types). A component is a fully specified software module in terms of structure and behavior, in which software module the functionality is described in self-contained form and can be manipulated only via predefined interfaces. If a system consists of many finely granular components, then it can be modified extremely flexibly at runtime. On the one hand the large number of explicit relationships leads to an increase in communication requirements between the many components. The resulting overhead is to the detriment of performance. On the other hand, however, the implementation of the abstraction mechanisms contained in the modeling constructs also impairs performance. If the same system is represented by a small number of coarsely granular components, then the implementation becomes more efficient. Optimization potential can be exploited by merging many finely granular components into a few coarsely granular, inseparable concrete components.

In principle the software engineering approach adopted in process control engineering (or in automation engineering) is similar to the general software engineering approach. However, the initial conditions for the use of software in process control engineering differ considerably in some cases from the initial conditions in other application domains:

The software applications are not produced solely by the vendor; rather, a substantial number thereof are written by the user and tailored to said user's needs.

Some of them have very long service lives and during this time are regularly optimized, supplemented or replaced in line with changed requirements.

They must interwork with a plurality of third-party applications (in the simplest case exchanging the latest data and messages).

They must exhibit a high degree of independence from the computer platform, since a heterogeneous hardware environment arises almost inevitably over the course of time.

In particular the two first-mentioned initial conditions led to certain techniques being developed in process control engineering at a very early stage and having a decisive influence on the software engineering approach:

Software applications are produced in-house by the user to a very large extent by connecting together ready-made components (e.g. function modules) from a module library and tailoring them to the user's needs. The aim here is to free the user from the necessity for (textual) programming, at least in the solution of routine tasks.

Possibilities have been created which permit changes to the software (reconfigurations) to be made during ongoing online operation (for example the instantiation of module types in a PCS or the incremental "delta download" in the PLC). This means that configuration and operation no longer have to be performed in a strictly sequential manner.

In process control engineering a number of terms for specific activities have been coined in this connection. For example, one refers to "projecting" or "configuring" in contradistinction to the activity of programming. While programming, according to DIN 19226 Part 5, comprises the "activities of designing, coding and testing a program" and consequently as a rule includes the editing of (textual) source code, projecting or configuring is understood as meaning the engineering-oriented process of "constructing" a complex program from simpler, already existing and debugged components, without the need to edit source code. Projecting or, as the case may be, configuring for its part comprises the activities of structuring and parameterizing. In structuring, the structure of the application (that is to say, the number of software components and their relationships) is modified by adding new components to the application, connecting them together or deleting them again. In parameterizing, the variables of the components are assigned values which influence the behavior of the components and hence the overall system. The component structure remains unchanged in this process, however.

To simplify, it can be assumed that the lifecycle of software applications in process control engineering can be subdivided into the following three phases (whereby the second and third phases can be performed simultaneously):

Modeling and programming of components (analysis, design and implementation)

Configuring (projecting) the application system from components (system construction) and Operative running of the application The models of process control engineering applications to be implemented usually include basic elements of object-oriented programming. If the already mentioned engineering phases in process control engineering are also taken into account, then it appears an advantageous approach to represent the objects required for the functionality of the P2P system in the implementation by means of software components configured at runtime.

As the focus is on structure-oriented aspects during the composition of the application system and the system is to be flexibly modifiable at runtime, the P2P system is necessarily a "white box" whose inner structure is transparently visible through the system interface (identifiable objects and relationships). In contrast thereto, the internal layout (or, as the case may be, the inner structure) of the individual components is irrelevant at runtime according to the "black box" principle. It is only significant during the implementation of the respective component at the level of programming by means of a programming language, possibly C, C++ or Java. During the implementation of a component its behavior is also specified. The behavior (or, as the case may be, the functionality) of the application system, on the other hand, is produced implicitly from the behavior of the individual components as well as from their relationships in the sense of "a system is more than the sum of its elements".

In the early days of programming, mainframes were very complex and expensive—and along with them so also were the programs which ran on these computers. As the systems became older, it was not possible to replace them for cost reasons, with the result that programmers extended the functionality in stages by adding new code. The programs and their systems became more complex and more and more impenetrable.

Object-oriented programming arose as a response to the problems that resulted from this ever-increasing complexity of the "legacy" systems. Modularity and reusability seemed to be the solution to the problems of the "legacy" systems. Remote procedure call (RPC) architectures arose in order to get a grip on the problems that occurred during the communication between components on different computers. The two most successful RPC architectures, DCOM and CORBA, did in fact become widely established, but were still far too complex to guarantee convenient interoperability between different systems. In order to design a distributed architecture which can be operated in a heterogeneous computer environment and a very large network such as the internet with a minimum amount of engineering overhead, a simple, platform-independent possibility of communication between applications is required.

It is possible to put together powerful systems from simple components (see Web Services) which in a suitable framework are intelligent enough to organize themselves. This framework offers a service-oriented architecture (SOA). Service-oriented means that such an architecture supports the dynamics, self-description, publication, discovery and use of services. A service is a self-contained (program) unit which offers a special functionality. This functionality can be accessed via a clear interface. The functionality is the capability of a resource to implement a function required of it in order to solve a specific task.

Conceptually the SOA model consists of three roles which perform three basic interactions. The components of the SOA are the services which consist in principle of two parts:

Firstly, the implementation of a service. A service can be of any size and be programmed in any language. The central requirement here is that the service runs on a platform which is provided by the service provider and can be accessed via the network. In principle there exist two ways to implement a service: either to develop the service and the associated interface new from the ground up, or to develop a service wrapper for an already existing application and the associated interface.

Secondly, the service description, the interface of a service. It is written for example in XML (Extensible Markup Language) and is subject to one or more standards. Included in this description are the data types, operations, protocol bindings and locations in the network (URL etc.) which have the implementation of the service. Additional meta information, such as categorizations or Quality-of-Service (QoS) specifications, make it easier to find a service in a targeted search.

To sum up, services within an architecture of this kind are loosely coupled, discoverable components which communicate via XML-based interfaces. The individual characteristics are defined here as follows:

Loosely coupled: The services and the programs invoking them are interchangeable independently of one another.

Discoverable: The description of the behavior, the input/output parameters and the binding mechanism are publicly available.

Component: The implementation of a peer service is encapsulated; the functionality can only be discovered via the interface description.

XML-based: Human-readable, text-based format and therefore self-describing, which is the prerequisite for a platform-independent protocol.

As already mentioned, the SOA is based on the interactions between three roles: A provider, a broker (registration point)

and a user. The interactions between these roles include the publishing of information about a service, the finding out of which services are available, and the connecting to these services. In a typical scenario a provider provides the implementation of a service. The providers define service descriptions of the services contained therein and publish them in a registration point. A user then uses the registration point to find service descriptions for the services in which he is interested. On the basis of the service description the user then connects to a service and calls up said service. A service-oriented architecture provides a powerful framework for the development of modular applications. However, the centralized structure of the SOA is too inflexible for many applications.

The P2P approach offers a service-oriented architecture in a decentralized, self-organizing environment. The P2P approach differs from the SOA in that no attempt is made to define explicit roles. Any node or peer can take on any role that it knows or can learn via other peers in the P2P network. No clear separation exists between providers, users and brokers. This is the essential difference between the "Web Services" and the P2P architectures. Whereas the "Web Services" model still follows a traditional architecture comprising central servers, P2P is a totally decentralized system in which the responsibilities are distributed among the peers.

In addition to the necessity for a decentralized, self-organizing system which results from the initial conditions of the application scenario, the technical advantages of the peer-to-peer model are also clearly recognizable: These are a more efficient use of the network bandwidth and a higher level of availability. The concentrated, local traffic congestion situations which are so typical for example in today's internet do not apply to P2P. There are no dedicated servers. All interactions take place between individual peers, so there are no centralized bottlenecks. If a peer suffers a hardware crash, another peer from the network can process the request. If a peer is overloaded, it will answer the request too slowly and another peer will stand in for it.

In this context the term "semantics" is understood to signify the meaning of words that are used in the description of services and their parameters. Semantics have always been a thorny point in distributed systems. As long as the systems are relatively small and manageable, object-oriented approaches offer a good way to get a handle on this problem. The naming conventions for methods and their parameters usually indicate to the developer which meaning they have. In a large system the semantics of a class or service usually cannot be derived unequivocally through its interface alone. The problem becomes even greater if a number of organizations are involved in a distributed system. The increasing use of XML brought little help in solving these issues of comprehension on account of inherent extensibility. Owing to the fact that the meaning of XML tags were specified in XML schemas, each developer designed his own set of definitions, which led to a "tower of Babel" situation.

The attempt to integrate ontologies, the human context that is absent in XML-based approaches, in XML schemas is known. An ontology is an agreement of a community with the same interests on the semantic meaning of terms. It typically consists of statements in the form "subject predicate object", where the object of one statement can in turn be the subject of a further statement. This can be represented graphically in the form of graphs with directed, named edges. It should be noted in this context that an ontology does not necessarily have to contain an object-oriented class hierarchy. A simpler approach is the use of taxonomies for the classification of services. By this is meant a hierarchical classification of things according to the principles of object-oriented modeling. The graphical representation has the shape of a tree. The semantics are only implicitly present here and also only comprehensible to human beings.

However, neither the ontology nor the taxonomy are suitable in their basic form for a large, distributed and non-centralistically organized service system. An ontology is much too complex and a taxonomy on its own is not sufficient for a targeted search for services. The solution proposed here avoids the disadvantages cited above. In addition to the existence of a services taxonomy, it is also advantageous to have what is called a "distance function" which uniquely defines the relationship between two services by specification of an arithmetic value. This distance function and the associated search groups will be dealt with in greater detail below. The distance function is used in the self-configuration of the network (by the control unit) and in the depth search (by the search services). It returns an artificially specified "proximity" between two peers. This definition of proximity is unique within the entire search network. Peer neighborhoods are formed on the basis of this proximity calculation.

A search network is formed by peers that are all members of a specific semantic group. The peers are nodes of this network. The edges of this network lead to the peer neighbors. A peer can be a node in a number of search networks. Every membership of a semantic group at the same time means a node in the associated search network.

Clear requirements have been formulated for modeling concepts and their technical implementation in software. The actual design of the P2P system is now described on this basis. For this purpose the underlying system structure of the P2P system is explained first, i.e. the basic components and services, as well as their interfaces. This is followed by the description of the model design for the components whose task is to form a P2P overlay network according to semantic criteria. These components are referred to in the following as a "semantic group" or "search group". A semantic group is therefore an association of peers, related in terms of content, which possess the same understanding of a specific, finite number of services. A peer can learn this understanding at runtime. Aspects of the actual implementation will also be explored with reference to the exemplary embodiment.

Figure 3:
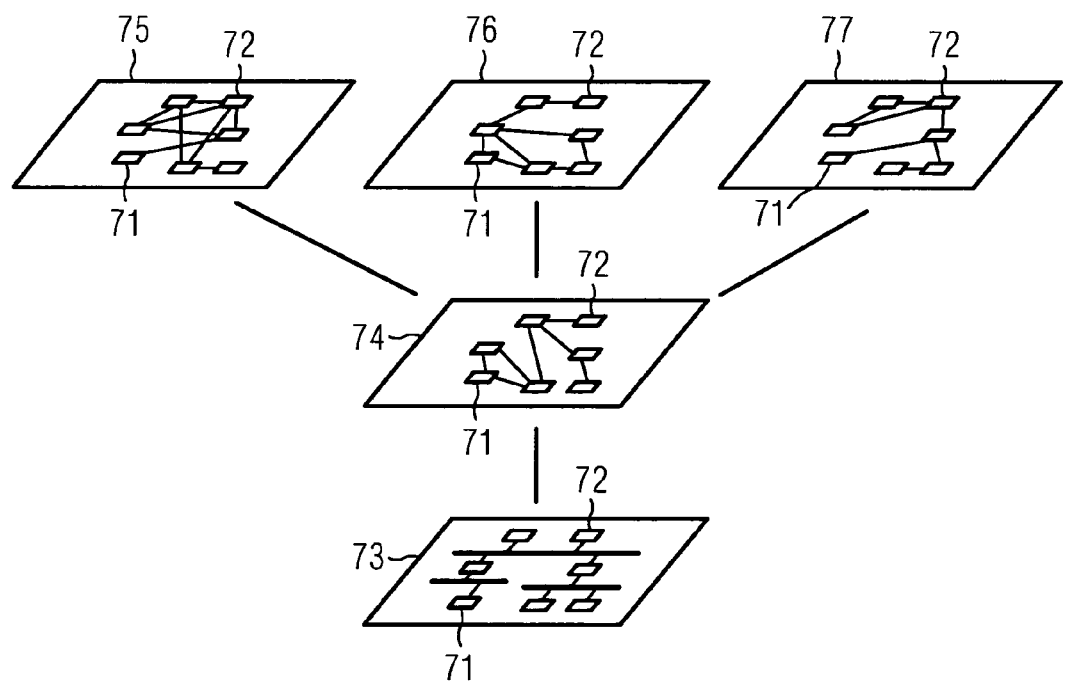
FIG. 3 shows a layer model for describing a multilayer architecture for a decentralized, self-organizing information system.

The layer model depicted in FIG. 3 describes a multilayer architecture for a decentralized, self-organizing information system. This generic layer model permits the peers 71, 72 to move simultaneously on different layers. The search strategy associated with each layer is based on a classification structure 75, 76, 77 of the peers 71, 72 which in principle is independent of the physical or network topological arrangement of the peers 71, 72. For optimization reasons, for example, it can however also be made dependent thereon, in particular when the desired information exists in multiple "identical" form (identity relative to the respective semantics of the classification structure 75, 76, 77) for multiple peers 71, 72, e.g. in a search for the "nearest" message server. Formation of a layer under the classification structures 75, 76, 77 is not mandatory, i.e. one classification structure 75, 76, 77 does not a priori overlay another. Different semantic classification structures 75, 76, 77 are not built hierarchically one on top of another, but are disposed parallel to one another and only share the infrastructure 73 of the P2P network. Typically, multiple different classification structures 75, 76, 77 exist simultaneously, so that in principle multiple search strategies are also present in parallel, which strategies can also be combined in a search.

What is special about these classification structures 75, 76, 77 compared to search criteria in present-day P2P networks is that both the search criteria and the search optimization criteria are oriented toward the common mission or service interface of the members of a search group. Only by this means is it possible to optimize the search algorithms according to the content of the search request and not to use the same algorithm independently of the search request. The definition of a classification structure 75, 76, 77 can be dynamically loaded into the peers 71, 72, including during ongoing operation. In this way it is possibly to incorporate new search strategies, but also new functionality into the system dynamically.

Figure 4:
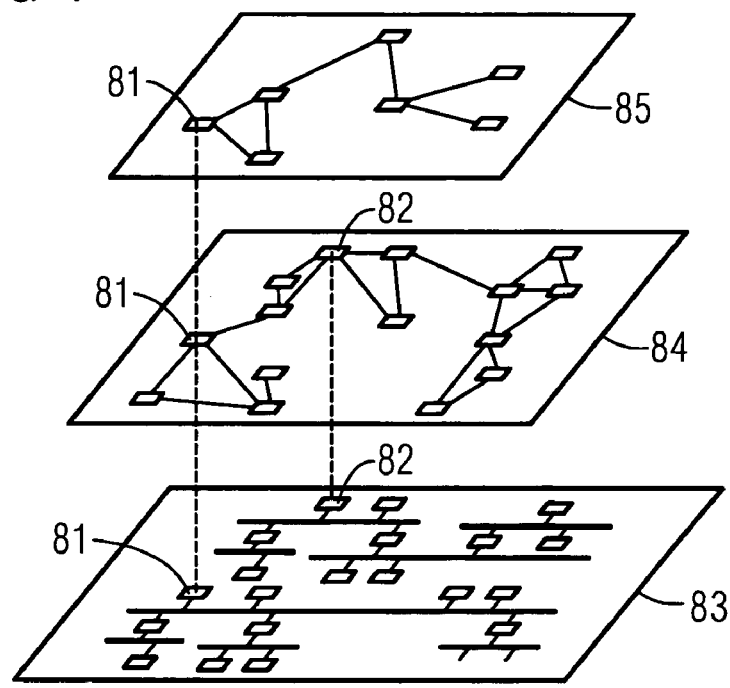
FIG. 4 shows a layer model in which each layer is characterized by an additive peer group affiliation.

In the model according to FIG. 4, each layer is characterized by an additive peer group affiliation, i.e. a peer 81, 82 that moves on a specific layer is not only a member of the associated peer group, but also a member of all peer groups of the lower layers. By gaining an additional new peer group affiliation a peer 81, 82 therefore also gains a new, semantically higher-ranking layer and must additionally engage in new neighborhood relationships for this layer, based on the organizational schema of the respective layer. If a peer 81, 82 loses a group affiliation, it loses only the neighborhoods in the corresponding layer. Because a peer 81, 82 enters into other neighborhoods in each layer, optimal network topologies can be guaranteed for the corresponding (most disparate) requirements on each layer. A necessary criterion for the effectiveness of these virtual search networks 85 is that the latter must be related. This is the task of the organization strategy. The choice of self-organization strategies for the respective layers does not form part of the layer model, since said strategies are dependent on the field of application. Only the interface of the semantic group is unequivocally defined for each layer. The implementation of the services of the semantic groups is encapsulated by the respective layer. The basic services, on the other hand, are specified unequivocally. The first search network 84 already develops "generically" with the provision of the basic services. All peers 81, 82 are members of this search group. The bottom layer is the actual physical network 83 comprising the peers 81, 82.

Not every peer 81, 82 must be contained in all the classification structures. The peer sets defined by the classification structures (the so-called "semantic groups") are therefore not congruent as a rule. Prior to a search operation the members of a semantic group are usually only partially known to the peers 81, 82 concerned, in particular the peer that starts the search operation (limited neighborhoods). On the other hand, all peers 81, 82 in a semantic group can nonetheless be reached in principle from a peer 81, 82. As a result of the two last-mentioned characteristics, the system automatically adapts itself to changes of the system, caused, for example, by partial failure of a subnetwork or the addition or removal of peers 81, 82.

Bilateral relationships exist between the peers 81, 82 in a semantic group which know of one another. The roles in these relationships are used for navigation purposes during the search operation. The roles can superimpose directions onto the relationships, e.g. "higher-ranking" or, as the case may be, "lower-ranking" peer, in order to model a hierarchy between peers. A search operation within a semantic group uses the above-mentioned relationships for navigation, with the search space being built up dynamically since each peer found during the navigation has only a limited view of its neighborhood. In this case the navigation is supported by the roles. A distance measure that is calculated for each peer found during the navigation speeds up the search operation. All scales which allow a "greater than", "less than", "equal to" result are permitted in principle for the variable "distance". In this context scale is understood to mean a comparison scale by means of which the value of a variable can be linked. Different types of scale are distinguished in this case according to the defined value range and permissible linkages. The metric scales include the ratio and the interval scales. The non-metric scales are subdivided into an ordinal and a nominal scale. In the case of distances with ordinal scaling the elements of the value set are ordered into a unique ranking sequence according to corresponding rules. In a pair-by-pair comparison of the occurrences this unique ranking sequence yields a result in the form of conclusions of the type "greater than" or "less than" in addition to the results in the case of nominal scaling.

The execution sequence of the search method is described step by step below. In a first step, a search request is generated. A search request can be generated in any peer. In the second step the peer that received the request searches in its group entities for the object being sought. The group entity is a component that is loadable at runtime, consisting of control unit, distance function and services, which implements the membership of a peer within a semantic group. If the object is located in one of these group entities, the search is terminated. The search is also terminated if the target object is not contained in a group entity of the current peer, but a predetermined maximum number of search steps has been reached. Otherwise the distance measure is used to determine that group entity and therefore also that peer (as administrator of the group entity) to which the request is forwarded. For this purpose the peer makes use of the distance function to calculate for each neighbor peer $P_i$ (where i is an element of $\{1,\ldots,n\}$) the minimum distance $dist_{i,min}$ between the target object and all objects of the respective neighbor that are known to it. The search request is forwarded to the neighbor peer $P_k$ which has the smallest minimum distance to the target object ($dist_{k,min} < dist_{i,min}$). The search request always contains the complete information concerning the previous search path and is passed on by one peer to the next. If a search ends successfully, in a third step a positive response is sent back directly to the peer that initiated the request. This message contains the address data of the found target and the identification of the search request. If a search was unsuccessful, a negative message is returned directly to the peer that initiated the request. This message contains the address data of the last node visited, the cause of the search abort and the identification of the search request. By means of this basic method the target is reached deterministically. However, if the peer that initiated the request receives no response within a predetermined tolerance time, it discards the request and where appropriate generates a new request. If the response arrives subsequently, it can no longer be assigned and is discarded.

The set of hits from a search can comprise more than one peer. In certain circumstances the set of hits can be limited by switching over to another semantic group and calculating in this group e.g. the distance measures for the peers in the hits group. In order to ensure that the set of hits includes all peers in the semantic group that match the search criterion, the transitive envelope of all peers that are reachable via navigation from a particular peer must be identical with the semantic group. This is ensured by performing a suitable "getting to know method" (e.g. via broadcast) when inserting a peer into the system or when discovering relationships that have meanwhile become invalid, or a suitable "leave-taking method" during removal.

Figure 5:
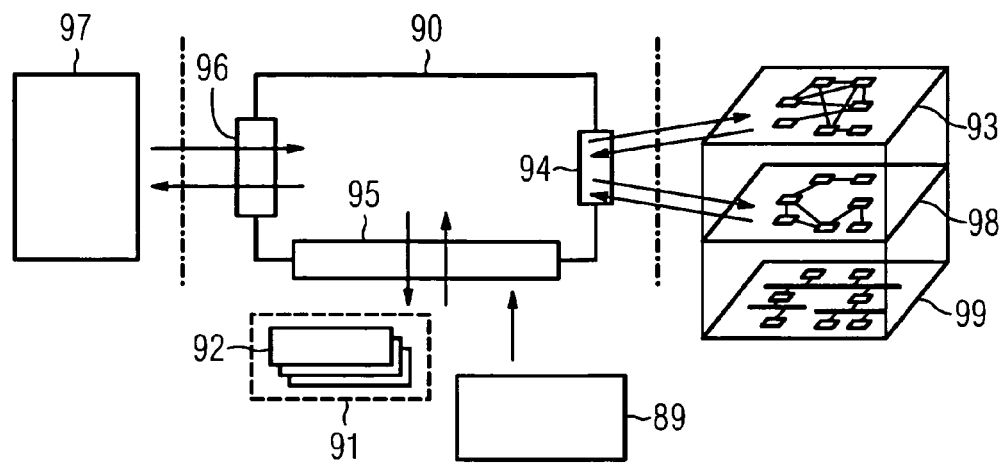
FIG. 5 shows the composition of the overall system by means of object components.

The modular nature of the layer model finds its correspondence in the composition of the overall system by means of object components as shown in FIG. 5 with unequivocally specified interfaces 94, 95, 96. The following procedure is proposed for the formation of a semantic overlay network: First, a certain basic functionality 91, consisting of a finite set of basic services 92, is loaded into a peer 90. As a result the peer 90 is fully capable of forming overlay networks 93 of arbitrary structure. However, the quintessence of a network 93 according to specific criteria is not part of the basic functionality 91 of a peer 90.

Only the loading of what is known as a group entity 89 enables an overlay network 93 to be formed according to semantic criteria. As the overlay networks 93 are used exclusively for the search for information or, as the case may be, services, these overlay networks 93 are also called search networks. Underneath the overlay network 93 lies the generic peer network 98 and the physical network 99. The peer 90 also has an interface 96 to an operator interface 97, e.g. an automated client.

A group entity of this kind consists of a control unit which possesses knowledge about a specific set of application services and their relationship to one another (for the purpose of calculating a distance to the target that is necessary for the depth search), generic services which each semantic group possesses, and the application services themselves. Any number of group entities can be loaded into a peer. Depending on whether they build on the services of other group entities or not, they lie, figuratively speaking, above or next to an already existing search network. The control unit is a functional unit which includes an algorithm or state machine for behavior control of a peer within a semantic group. It is responsible for the reorganization of the neighborhoods of its peers with regard to a semantic network. Using a distance function which every group entity possesses, the control unit decides which peers are possible candidates as neighbors and invokes the corresponding services. In this regard, each control unit administers the neighbor list of its network.

Traditional distributed systems require a common environment or, as the case may be, architecture to exist between cooperating units. If two units attempt to master a common task by means of J2EE, CORBA or DCOM, then a common architecture exists for the invocation of operations or the sharing of data. Although a common architecture makes it relatively easy to combine applications with one another, it does not necessarily guarantee interoperability. The underlying idea now consists in allowing the communication between the most disparate objects to take place using the smallest common denominator, that is to say ASCII character strings. The "Extensible Markup Language" (XML), which affords a platform-independent means of specifying information, appears suitable for this and forms the basis of all peer services. The "Simple Object Access Protocol" (SOAP) runs on top of XML and supports the exchange of information in a decentralized, distributed environment. SOAP consists of a set of rules for information encoding and a specification for representing remote method calls (RPC=Remote Procedure Calls) and their responses. The "Web Services Description Language" (WSDL) specifies the service interfaces, i.e. which service parameters have to be passed and which information returned. In combination, SOAP and WSDL permit platform- and data-independent specification and distribution, as well as the use of services according to the roles in a services-oriented architecture. By means of these protocols applications from different fields and different platforms can work together.

Basing peer services on XML has the disadvantage of the size of the volume of data to be transferred. The use of XML increases the "net" data volume by a multiple during the transmission and consequently requires more memory resources and more transmission time. The flexibility of SOAP(XML) messages also results in more computing time needing to be made available for formatting and parsing the messages. Nevertheless, the use of XML is advantageous because the flexibility offered by XML is necessary if many different application domains are to be catered for by means of a single technology. On the other hand it is not necessary to keep XML data resident within a single system. More suitable, proprietary representation formats are available for this purpose. However, XML is currently still the most suitable means of choice for information exchange in a heterogeneous environment.

To aid further understanding, the four technologies XML, XML Schema, SOAP, and WSDL will be presented briefly below.

All messages that peers exchange with one another and that the components within a peer send, are XML messages. In order to describe the structure of documents, XML uses markers known as "tags" which identify and delimit the individual parts of an electronic document. Each of these parts is referred to as an element. Elements can be nested inside one another. The uppermost element of a document is known as the root element and the elements that are enclosed by the root element are known as child elements. A child element can therefore contain further child elements. XML elements begin with a start tag and terminate with an end tag, with each tag identifier being enclosed in square [sic] brackets (<...>). The end tag has the same identifier as the associated start tag, except that it is prefixed by a "/" character to distinguish it. Thus, a level element, for example, is represented as follows:

<level>23,34</level>

XML defines only a small set of syntax rules, such as, for example, that a start tag always also possesses an associated end tag. XML documents are designed strictly hierarchically as a tree.

XML Schema is an approach for defining document types and therefore for specifying XML languages. With the adoption of XML as the industry standard in 1999, the Document Type Definition (DTD) taken over from the Standardized Generalized Markup Language (SGML) initially established itself as the format for describing actual XML languages. However, with the rapid spread of XML in practice, the limits and drawbacks of DTD became increasingly noticeable. In particular the document-centric view of DTD at the same time as the neglecting of data types reveals itself as a problem in times when the programming languages are moving closer toward data modeling. DTD permits neither the description of specific semantic conditions nor the specification of value ranges. However, it is precisely the increasing spread of distributed and inhomogeneous applications that requires a means of transporting data in a uniform, but at the same time flexible and easily modifiable format which also allows itself to be easily evaluated (parsed). XML Schema provides numerous data types, together with the possibility of explicitly specifying the value range. Further complex element types can then be defined using these basic types. This one-time definition of data or element types with possibly frequent use on the one hand improves the readability of the schema and on the other hand facilitates subsequent processing by means of a parser. Moreover, XML Schema enables the definition of new element types on the basis of previous definitions (inheritance) and supports so-called namespaces. Through the inclusion of namespaces document instances can be produced which access elements in different XML Schema descriptions. Elements with the same name but a different structure can appear in the same document instance, provided they are separated by namespaces. XML schemas are used in the P2P system for specifying the peer messages.

SOAP is a unidirectional, XML-based communication protocol for enabling the exchange of structured and typed information. Although it is unidirectional, SOAP messages can be combined to enable request/response interactions. The information contained in a SOAP message can represent both documents and remote procedure calls (RPC), which invoke specific methods at a service provider. The SOAP standard specifies three parts in this regard: The coding and classification rules, the RPC conventions and the envelope structure. Every SOAP message consists of an envelope which optionally contains a header, mandatorily followed by a body. The header contains information blocks which relate to how the message is to be processed. These include specifications concerning routing and delivery, statements regarding authentication or authorization, and transaction contexts. The body contains the actual message that is to be delivered and processed. Everything that can be expressed in XML syntax can be included in the body of a message. The peer messages use only the SOAP body.

WSDL documents describe both abstract and real details of a service. The abstract part of a WSDL document describes characteristics of a service that are specified by the developer and that are independent of the implementation. The real part of the document describes aspects that are specified by the service provider. The definition of an interface in WSDL begins with the definition of the data types that are exchanged via the interface. The "type" component declares the namespace and the data types that are used in the messages of the service. These are application-specific data types. When SOAP is used as the message format, the messages defined in the "message" component appear in the body of a SOAP message. The header is defined at some other point in the WSDL document. The component "PortType" defines the operations that are supported by a logical endpoint and the sent or received messages belonging to the operations. Up to this point no implementation-specific details have yet been given. Thus, for example, the transmission protocol, the coding of the data and the physical address of the port have not yet been specified. These are specified by three further components. A port is a subobject of a service. A set of ports describes the interface of a service and serves for storing data that is exchanged with the environment of the service. However, WSDL is not mandatorily linked to SOAP. The interface described by means of WSDL can also be implemented using other protocols. There exist both HTTP and SMTP bindings. The use of WSDL does have one disadvantage, however. Since WSDL permits a mutually independent specification of the individual components, a great amount of redundancy exists in a WSDL document. This redundancy, in conjunction with the use of XML, is responsible for the considerable size of a WSDL document compared with the size of an actual SOAP message which defines it.

Figure 6:
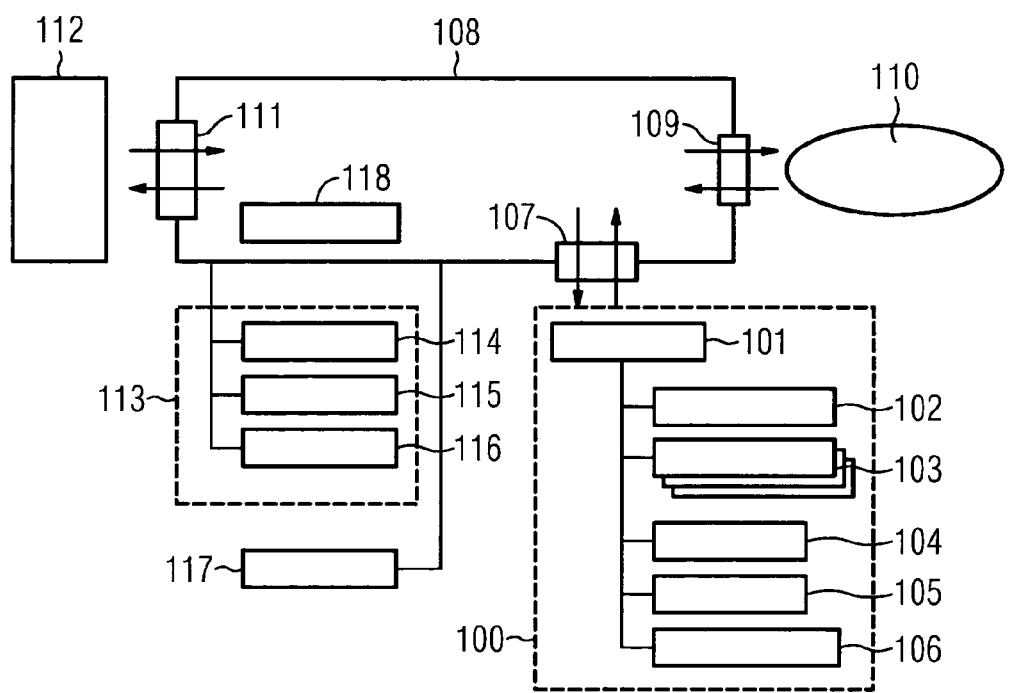
FIG. 6 shows the modular structure of a peer for a semantic search network.

FIG. 6 shows the modular structure of a peer 108 for a semantic search network. This form of structuring enables a peer 108 to be extended by further services (or more accurately: group entities 100) at runtime. In terms of object-oriented modeling, all the system components are objects within an object management platform which also simultaneously represents the runtime environment. As shown in FIG. 6, the group entities 100 and the objects necessary for operation are linked to the peer 108 for the purpose of the message conversion 113 between textual SOAP(XML) messages and platform-specific message objects. These objects are, for example, a class generator 114, a serializer 115 and a deserializer 116. The basic services 102 to 106, which together with their control unit 101 form a special group entity 100, are loaded during the initialization of the peer 108; all other group entities can be loaded and also removed again during stationary operation. The internal communication between peer 108, control unit 101 and services 102 to 106 takes place according to the exemplary embodiment via SOAP(XML) message exchange 107. This also applies to the communication 109 between peers in the network 110. In addition each peer 108 possesses, independently of the existence of semantic groups 100, a peer list 117 in which all peers with which a peer 108 has communicated, are administered. This list 117 is relevant above all at the time of the registration of a peer 108 in a new search network, since in this case a peer 108 must always know another peer that is already registered in the search network as an "access node".

Any graphical interfaces or, as the case may be, frontends as well as automated clients 112 can be linked to the peer 108 via an interface 111. The frontends themselves do not need to generate any complex SOAP(XML) messages, but must only pass short commands with corresponding command parameters to the peer. In this case the peer-internal "SOAPBuilder" 118 generates therefrom a SOAP(XML) message that is intelligible to the peer. A web server, for example, can be used as the client 112, which web server uses the widely established HTML protocol (via TCP/IP) as the transport protocol toward the web browser side, and a proprietary communication protocol toward the platform server side.

The functionality of the individual components will be described in more detail below. In stationary operation the peer 108 takes on the function of a distributor. It analyzes which messages from the network 110 have to be passed to which of its control units 101 and is also responsible for the delivery of a message that a control unit 101 would like to send into the network 110. The internal distribution of messages runs in two stages: The peer 108 distributes the messages to the corresponding control units 101 and the control units 101 in turn distribute the messages to the relevant services 102 to 106 for processing. The service objects 102 to 106 alone are responsible for processing incoming messages. Only they and the control units 101 can generate new messages. The peer 108 is also a broker in the message traffic between a client 112 and the corresponding control units 101 as well as in the internal message traffic between different services 102 to 106. In addition the peer 108 possesses the functionality to load or, as the case may be, to remove new group entities 100 again during stationary operation. When a group entity 100 is loaded, a peer 108 gains a new group membership in a semantic group. A peer 108 itself does not necessarily have to possess all the services 103 that are assigned to a semantic group and provide them in the network 110. Simply the knowledge of the existence of all the services 102 of this group, which in technical software terms goes hand in hand with the loading of the control unit 101, is sufficient for a membership.

Every control unit 101 in a group entity 100 possesses its own state machine and is responsible for the reorganization of the neighborhoods of its peer 108 with regard to the latter's semantic network. Using a distance function 104 which every group entity 100 possesses, the control unit 101 decides which peers are possible candidates as neighbors and invokes the corresponding services. In this regard each control unit 101 administers the neighbor list 105 of its network.

Each service 103 is represented by an associated service object. In the exemplary embodiment the services 103 are specified in the WSDL language and their interfaces can be explicitly requested from the service object. All the service objects possess an XML interface, known as the port. The complete interface model of a service is heavily oriented toward the WSDL specification and has four transmission primitives (operation types). The primitives result from the number and sequence of the messages.

The basic services (incl. control unit) are loaded automatically at the time of initialization of the peer. In this way each peer is automatically a member of at least one semantic group, the "generic" basic group. The peer finds the information on which services belong to the "generic" group in a corresponding XML file of the same name. A file of this type, in which the associated services and configurable service parameters are noted, exists for each semantic group.

The messages that peers exchange with one another are text messages. This also permits communication between peers that are possibly resident on completely different platforms. In order that a service can process received messages, however, the latter must first be converted into a platform-specific format, a message object. From the service specification, the WSDL file which also contains the corresponding data structures of the messages, the so-called class generator 114 generates the associated platform-specific message classes. These message classes are generated during the loading of a service or, as the case may be, a service object. The peer 108 requests the service specification from the service and passes this specification to the class generator 114. If a service generates a new message, the service instantiates the corresponding message class which the class generator 114 has already created at the time of the loading of the service. It then fills out the corresponding entries and transfers the message instance to the serializer 115 which generates a valid SOAP(XML) message therefrom. The service then transfers the message to the peer 108, which sends the message into the network 110. The corresponding service also stores the message, or more accurately the message object, in the message archive 106. Each group entity 100 possesses its own archive in which all sent and received messages are stored for possible network analyses. The deserializer 116 has the exactly opposite function to the serializer 115. It receives an XML message from the service and generates a new instance of the corresponding message class. It then enters the values from the XML message into the variables of the instance and transfers these to the service object. The service thereupon evaluates the information from the message instance.

A peer 108 can process both SOAP messages and proprietary command lines on the client side. In the latter case the SOAPBuilder 118 has the task of converting the received command lines into valid SOAP messages. To permit this, the SOAPBuilder 118 requests the corresponding WSDL service specification from each loaded service and generates SOAP message templates, i.e. ready-made message models. If the peer now receives a command from a client 112, it forwards the command to the SOAPBuilder 118. The latter fills the corresponding template with content and passes a complete SOAP message back to the peer. The SOAPBuilder 118 also serves for internal communication between different services. When a service wants to invoke another service, it sends the corresponding command to the SOAPBuilder 118 just like an external client. The SOAPBuilder 118 generates the SOAP message and passes it to the peer 108, which then forwards the message via the control unit 101 to the relevant service.

Each group entity 100 possesses a distance function 104 which is specific to it and returns the "nearest" peer, based on semantic criteria. In a search strategy which follows the principle of a depth search, this distance function 104 is initiated in each search step by the current node in the search network in order to learn to which node a search request is possibly to be forwarded. The distance function 104 is also used at the time of registration in the network. It is used by peers as a basis for determining whether to accept another peer as a neighbor or not. However, peers should in principle be concerned to form so-called "small world" structures in the network in order to increase availability and scalability. In this way they will also accept as neighbors peers which, among all the peers known to them, do not possess the least distance to them. A rough tripartite division of the numerically limited neighbor list 105 into near, medium and remote neighbor peers reveals itself as advantageous.

The basic functionality of each peer consists of five services, each of which is covered by one service object. Subsequently, the basic services were presented in detail. All of the services comprise components in terms of the equation: "component=object+description+standardized service". These basic services form the foundation for erecting a virtual search network and serve higher-value services from other group entities in order to establish new search networks. The services are designed such that their functionality can be effectively used by services of other semantic groups. The operations are specified below, together with the messages associated with the respective operation which run via the respective port of these services.

Every message in the peer system possesses a globally consistent message header. The basic functionality makes no provision for a peer to contact other peers independently or to engage in neighborhoods. In this peer state a network can only be set up manually via requests of a client. The register service consists of a number of operations. Only the first operation "RegisterCommand" is intended for the communication between a client and a peer. The other operations serve for the network-internal communication between peers. In the network-internal operations the first component of the operation name specifies the direction of the first message from the viewpoint of the service, i.e. whether the operation is initiated itself or by an external request. The messages themselves are SOAP(XML) documents.

A client initiates a registration of its peer with another peer, and therefore the establishment of a neighborhood relationship, by sending the message "RegisterCommand" to the peer. The peer recognizes on the basis of the "Group" entry in the header of the message that this message is intended for the control unit of the basic services and forwards the request to said control unit. The control unit in turn recognizes on the basis of the "Service" entry in the header of the message that this message is intended for the register service and passes it to the latter. As soon as the register service has received a valid "RegisterCommand", it generates a "RegisterRequest" and sends it to the relevant receiver peer. The service then starts a timer for this request. If the timer has elapsed without a response having been returned from the receiver, the registration attempt is deemed to have failed and a "Register-Fault" is sent to the client. All responses relating to this request that arrive after the timer has elapsed are discarded. If the register service has received a "RegisterResponse" as a response within the time period, it enters the peer with which a new neighborhood is to be established in the neighbor list. An entry is also made in the peer list. The client receives a "RegisterReply" as an acknowledgement. If the register service has received a "Register-Fault", for example because the neighbor list of the contacted peer is full, this message is forwarded to the client.

Every peer must periodically exchange acknowledgements with its neighbors, whereby the time interval T between two acknowledgements is a global parameter and is specified by the peer system. Toward that end each peer sends an "Alive"

message generated by the register service to its neighbor peers. Apart from the header that every peer message possesses, the "Alive" message carries no further information. When a peer receives an Alive message, it forwards it to the register service. The register service updates the "Alive timestamp" for the peer in question in the neighbor list. The register service monitors these timestamp entries and removes peers from the neighbor list if a certain multiple of the acknowledgement period T has been exceeded.

The basic functionality makes no provision for a peer to independently dissolve the neighborhood with a peer. In the "generic" group a neighborhood relationship can only be dissolved manually via requests of the client. The deregister service consists of a number of operations. A client initiates the dissolution of a neighborhood relationship of its peer with another peer in respect of the "generic" group by sending the message "DeregisterCommand" to its peer. After a peer has received a "DeregisterCommand" from its client and removed the corresponding neighbor peer from its neighbor list, the peer sends a "DeregisterInfo" message to the former neighbor peer. If a peer has received a "DeregisterInfo" message from another peer, then said peer also removes the sender of the message from the neighbor list belonging to the "generic" group.

The so-called GetPeerInfo service serves for collecting information about a quite specific peer which does not necessarily have to be a neighbor. Depending on the value of the Boolean service parameter "Extended", there are two types of responses to a GetPeerInfo request: The short response supplies only information about the requested peer itself in respect of its group memberships and services. The detailed response additionally supplies information about the neighbors of the requested peer together with their group memberships and their services. This information is entered in the peer list. This service is used for updating the peer list. Information about peers that are registered in the network and belong to a certain group is collected and entered in the peer list. In the event that neighbor peers of a certain semantic group can no longer be reached, a peer must engage in new neighborhoods. For this purpose it makes use of the information from the peer list. Furthermore a peer that has loaded a new group entity always requires a further peer as an access node to the search network for this group. If it fails to find a peer that is also a member of this group in the peer list, the control unit of the group entity in question activates the GetPeers basic service. The GetPeers service consists of a number of operations. As with the other basic services, only the first operation "GetPeersCommand" is intended for the communication between a client and its peer. The other operations serve for the network-internal communication between peers. The operation "GetPeersCommand" can, however, also be activated by control units of other group entities. A client or a control unit initiates an update of the peer list of its peer in respect of a specific group by sending the message "GetPeersCommand" to the peer. The peer thereupon starts a width search in the "generic" search network. The radius of the search is defined by a "Hops" parameter. This parameter is passed to the peer together with the name of the semantic group by the client or, as the case may be, control unit.

After the GetPeers service has received a "GetPeersCommand", it generates "GetPeersRequest" message and sends said message to all of its neighbors. The "Hops" and "Group" parameters are taken over from the preceding "GetPeersCommand". However, the Hops parameter is always decremented by the value "1" before a "GetPeersRequest" message is sent. In two further parameters the peer enters its name and its address so that a peer that belongs to the group being sought and has received the request via a few hops can set up a direct point-to-point connection to the searching peer. Said peer sends all the information about itself that is necessary for a full entry in a peer list. Said information includes its group memberships and the names of the services that it administers as a member of the respective group. The names of the basic services are not sent as well because every peer has these and they represent the basic functionality of each peer.

The GetPeers search algorithm corresponds to that of a width search. The neighborhood edges in the peer network are only used for the search. The positive response to a request is made by direct point-to-point communication between the peer that initiated the request and the peer that possesses the information being sought.

As already mentioned, a peer does not actually also have to provide all the services that belong to a semantic group. Simply the knowledge about the existence of these services, which in technical software terms happens with the loading of the control unit, is sufficient for a peer to be able to become a full-fledged member of the search network in question. If a control unit now cannot forward a message to the corresponding service which is specified in the header of the message, then this message finishes up in the "Default" service. Every semantic group has this service, which is responsible for finding a peer that provides the said service. If there is no corresponding entry in the peer list, the "Default" service activates the "GetService" basic service. Thus, the "GetService" service is invoked in order to search for a peer which provides a particular service in the network. As each service is assigned to a semantic group, the search is conducted along the edges of the overlay network of this group if the name of the group is also specified in addition to the name of the service being sought. If no group is specified in the request, the search is conducted along the neighborhood edges of the "generic" network. The search algorithm of the "GetService" service corresponds, like the search algorithm of the "GetPeers" service, to a width search. The "GetService" service consists of a number of operations. The first operation "GetServiceCommand" is intended for the communication between a client or, as the case may be, a control unit and the "GetService" service. The other operations serve for the network-internal communication between peers.

A group entity is a self-contained component which is additionally loaded dynamically during stationary operation of a peer and can also be removed again. According to the exemplary embodiment each group entity contains a control unit, a distance function, a register service, a deregister service, a default service and a neighbor list. Optionally, an unlimited number of application services can also be assigned to a group entity. The necessary default service is responsible for processing messages that the control unit cannot forward to the associated service because the peer does not provide this service. It is optional whether the default service forwards the received messages to other peers in the network which possess the service associated with the message. The procedure for implementing a group entity and the internal execution sequence when loading a group entity during stationary operation of a peer will be described below.

Figure 7:
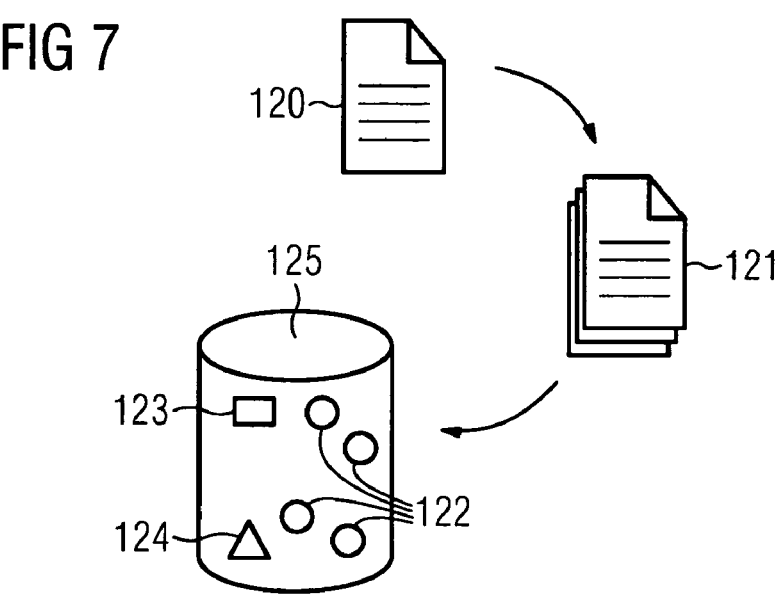
FIG. 7 shows the implementation of a group entity.

The implementation of a group entity takes place in three steps (see FIG. 7. First, an XML document 120 is created in which the components of the group entity in question are listed. Associated with each component there also exists a reference which specifies in which library 125 the class resides. Next, the WSDL service descriptions 121 are specified. After the interface of the group entity has now been established, the corresponding classes are implemented.

When a peer receives the instruction from a user to load a new group entity, the peer looks in the XML document 120 of the same name to discover in which library 125 (DLL=Dynamically Loadable Class Libraries) the control unit is located and instantiates the latter. The control unit in turn loads the services 122 listed in the XML document 120 and the distance function 124 and in addition generates further components that may possibly be required. As soon as a service 122 has been loaded, the service 122 loads its WSDL file 121 and passes the "types" component of the WSDL service description 121 to the class generator, which generates the platform-dependent message classes for the respective services 122. After this, the control unit 123 asks each service individually for its WSDL service description 121 and passes it to the peer. Finally, the state machine of the control unit is started for stationary operation.

The overall architecture provided for stationary operation will now be described: The basic services required for operation and the group entities are linked to the peer. The basic services are loaded at the time of initialization of the peer, i.e. with the instantiation of a peer class; the group entities can be loaded—and also removed again—via an operator interface during stationary operation. The internal communication between peer, basic services and group entities is effected via SOAP(XML) message exchange. This also applies to the communication between peers in the network. Any graphical interfaces or, as the case may be, frontends can be linked to the peer.

The inventive method further comprises the following features:

That the objects (7, 8) determine affiliations of the respective object (7, 8) to the groups (9, 10).

That the objects (7, 8) load and execute a distance function, the distance function determining the semantic distance between two objects (7, 8) in each case.

That the objects (7, 8) generate a list of objects (7, 8) with the least semantic distance to the respective object (7, 8).

That the objects (7, 8) influence the search for objects (7, 8) as a function of the respective semantic distance.

That the objects (7, 8) process descriptions (35) of the services (1, 2).

that the objects (7, 8) forward search requests for services (1, 2) which cannot be executed by the respective object (7, 8) to further objects (7, 8) within the respective group (9, 10).

That results of different searches can be combined.

That new objects (7, 8) within a group (9, 10) are recognized.

That the objects (7, 8) of a group (9, 10) have a hierarchical relationship with one another.

That the services (1, 2) provide information.

That an object (7, 8) within a group (9, 10) only partially knows further objects (7, 8) of the respective group (9, 10), with all further objects (7, 8) of the respective group (9, 10) being communicatively accessible at least indirectly for the respective object (7, 8).

That the objects (7, 8) transmit messages (36), with the semantic content of the messages (36) being analyzed.

That each of the groups (9, 10) is a related group (9, 10).

That the network (3) comprising coupled computers (4, 5) is an industrial automation system.

The invention claimed is:

1. A system for providing services within a network comprising coupled computers and with a virtual peer-to-peer search network, the virtual search network being a semantic overlay network which is used for the search of information or the services, wherein the computers have storage mechanisms for storing objects, wherein the objects have first mechanisms for loading, storing and processing descriptions of groups, wherein the objects have second mechanisms for loading, storing and executing services assigned to the groups, wherein to each group belong those objects that have stored the description of the respective group, wherein the description of a group determines a semantics of the services assigned to the respective group, wherein the objects have search mechanisms for conducting parallel searches within different groups for objects having services assigned to the respective group and executable by the respective objects, and wherein the objects have third mechanisms for initiating the execution of the services which are executable by another object of the group and assigned to the respective group.

2. The system as claimed in claim 1, wherein the objects have fourth mechanisms for locating, reading and/or defining the descriptions of groups.

3. The system as claimed in claim 1, wherein the objects have fifth mechanisms for locating and/or defining the services assigned to the groups.

4. The system as claimed in claim 1, wherein the objects have sixth mechanisms for determining affiliations of the respective objects to the groups.

5. The system as claimed in claim 1, wherein the objects have seventh mechanisms for loading and executing a distance function, the distance function being provided for the purpose of determining a semantic distance between two objects.

6. The system as claimed in claim 5, wherein the objects have eighth mechanisms for generating a list of the objects with the least semantic distance to the respective object.

7. The system as claimed in claim 5, wherein the objects have ninth mechanisms for controlling the search mechanisms for the purpose of searching for objects as a function of the respective semantic distance.

8. The system as claimed in claim 1, wherein the objects have tenth mechanisms for processing descriptions of the services.

9. The system as claimed in claim 1, wherein the objects have eleventh mechanisms for forwarding search requests for services that are not executable by the respective object to further objects within the respective group.

10. The system as claimed in claim 1, wherein results of different searches can be combined.

11. The system as claimed in claim 1, further comprising twelfth mechanisms for recognizing new objects within a group.

12. The system as claimed in claim 1, wherein the objects of a group have a hierarchical relationship with one another.

13. The system as claimed in claim 1, wherein the services are used for providing information.

14. The system as claimed in claim 1, wherein an object within a group only partially knows further objects of this group, wherein all further objects of this group being communicatively accessible at least indirectly by the object.

15. The system as claimed in claim 1, wherein the objects have communication mechanisms for the transmission of messages, wherein the communication mechanisms having analytical mechanisms for analyzing the semantic content of the messages.

16. The system as claimed in claim 1, wherein each of the groups is related to another group.

17. The system as claimed in claim 1, wherein the network is an industrial automation system.

18. A method for providing services within a network including coupled computers and with a virtual peer-to-peer search network, the virtual search network being a semantic overlay network which is used for the search of information or the services, the method comprising:
- storing objects by the computers;
- loading, storing and processing descriptions of groups by the objects;
- loading, storing and executing services assigned to the groups by the objects, wherein each group comprises such objects that have stored the description of the respective group, and wherein the description determines the semantics of the services assigned to the group;
- searching in parallel by the objects within different groups for objects having the services adapted to execute by the services; and
- initiating by the objects the execution of the services, the services executed by another object of the group.

19. The method as claimed in claim 18, further comprising locating, retrieving and/or defining the descriptions of groups by the objects.

20. The method as claimed in claim 18, further comprising locating and/or defining the services assigned to the groups by the objects.

* * * * *

UNITED STATES PATENT AND TRADEMARK OFFICE
CERTIFICATE OF CORRECTION

PATENT NO. : 7,668,910 B2
APPLICATION NO. : 11/041031
DATED : February 23, 2010
INVENTOR(S) : Dinges et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1435 days.

Signed and Sealed this

Seventh Day of December, 2010

David J. Kappos
*Director of the United States Patent and Trademark Office*